UNITED STATES PATENT OFFICE.

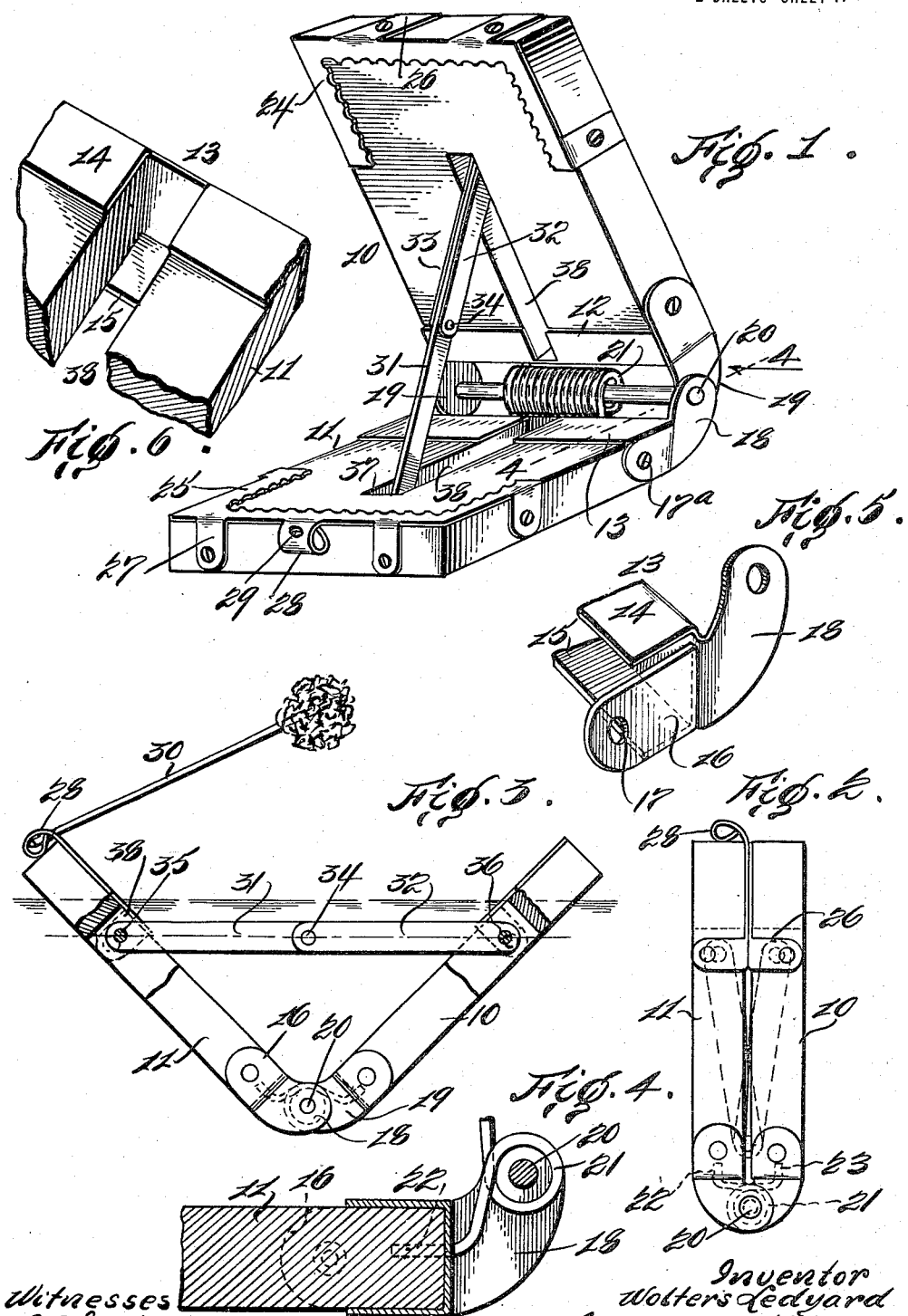

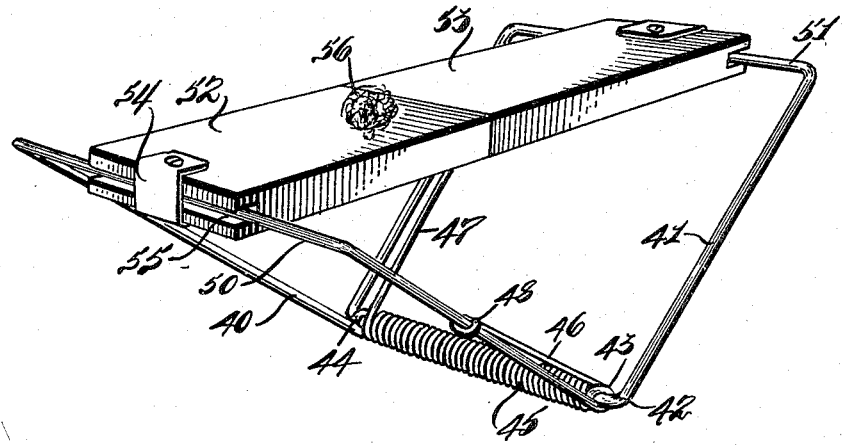
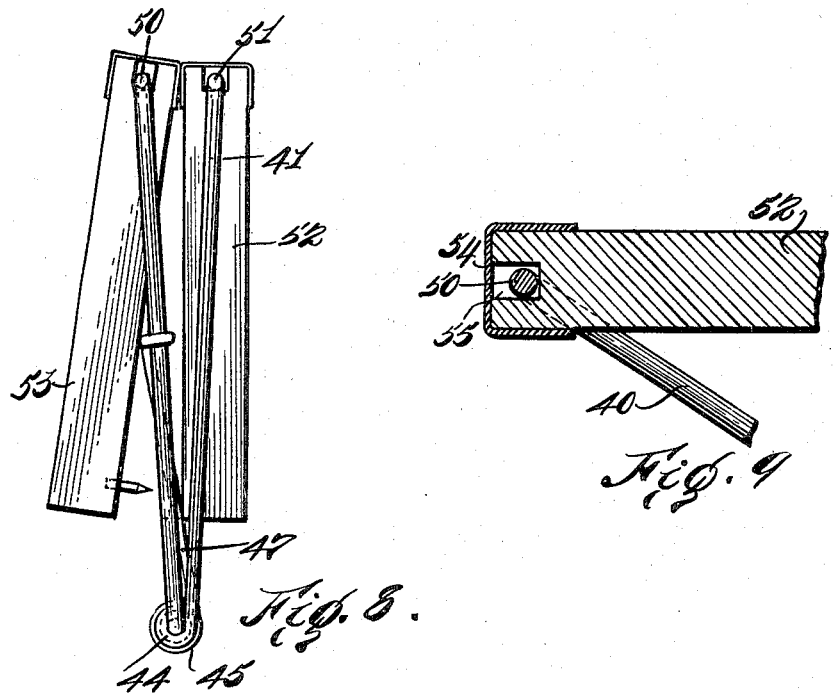

WOLTERS LEDYARD, OF CAZENOVIA, NEW YORK, ASSIGNOR TO ELIPHALET REMINGTON, OF CAZENOVIA, NEW YORK.

ANIMAL-TRAP.

1,160,623.  Specification of Letters Patent.  Patented Nov. 16, 1915.

Application filed January 12, 1915. Serial No. 1,734.

*To all whom it may concern:*

Be it known that I, WOLTERS LEDYARD, a citizen of the United States, residing at Cazenovia, New York, have invented certain new and useful Improvements in Animal-Traps, of which the following is a clear, full, and exact description.

This invention relates to improvements in animal traps, more particularly adapted for catching such animals as mink and muskrats.

One of the objects of the invention is to provide sensitive means for setting the trap in open position so that the jaws may extend upwardly in the form of a V.

Another object is to provide such a trap with buoyant means enabling the same to float.

Other objects are to provide a simple, practical and efficient animal trap.

These being among the objects of the present invention the same consists of certain features of construction and combinations of parts to be hereinafter described and then claimed with reference to the accompanying drawings illustrating desirable embodiments of the invention in which—

Figure 1 is a perspective view of one form of the trap in open position; Fig. 2 is a side elevation of the same in closed position, the bait-holding stick being omitted; Fig. 3 is a side elevation of the trap shown in active open position; Fig. 4 is an enlarged detail view showing a part of the jaw actuating means on the line 4—4 Fig. 1; Fig. 5 is a detail perspective view, broken away, of a portion of the latter means; Fig. 6 is a broken detail perspective view of the inner end of the jaws or spring-actuated members; Fig. 7 is a perspective view of a modified form of trap in set position; Fig. 8 is a side elevation of the same in closed position; and Fig. 9 is a detail illustrating one of the pivotal connections.

Referring to the drawings, Figs. 1 to 6 inclusive, the trap comprises a pair of spring-actuated jaws or members 10, 11, on the inner ends of which are located suitable reinforcing plates 12, 13 respectively, which are of U-shape in cross-section as shown in Fig. 4, so as to receive said inner ends. Each of said plates 12, 13 is similar and the plate 13 is provided with flanges 14, 15 which extend over upon opposite surfaces of the jaw or member 11. Said plates are preferably made of sheet metal bent into suitable shape and provided with end portions such as 16 which are applied to the opposite edges of the jaws or members, and which in turn are provided with perforations 17 to receive suitable fastening means such as screws 17$^a$, whereby the said plates are secured to the said jaws or members. Bent out from each of the plates 12, 13 in opposite direction to the perforated portions at 17 is a pair of perforated ears 18 on the plate 13 and a similar pair of ears 19 is located on the plate 12. The said ears are connected together, so as to connect the pair of jaws or members 10, 11, by means of a pin 20, which passes through the perforations of the ears 19 and is preferably riveted to the ears 18, the construction being such that the jaw or member 10 can swing or move relatively to the jaw or member 11. The said jaws or members are spring-actuated, to which end a helical spring 21 is located upon the pin 20 and the ends 22, 23 are inserted into the jaws or members 10, 11 as shown in Fig. 2 in dotted lines.

If the trap is to be used for catching mink or muskrats for instance, it is desirable that the jaws or spring-actuated members be provided with grasping means of such nature as will not injure the valuable fur of said animals. To this end toothed metallic strips 24, 25 are applied along the end and sides of the adjacent faces of the respective jaws, so that the teeth of said strips will not stand at right-angles to the meeting faces of said jaws, but toward each other on each jaw, or in a plane substantially parallel with the faces to which said strips are applied. Said engaging members 24, 25 may be secured to the jaws or spring members in any suitable manner as by bent up lugs 26, 27 suitably fastened to the edge portions of said jaws respectively.

One of the strips or engaging members, as 25, is provided at its mid-length with a bent up portion 28 which is located at the end of the jaw 11 and is provided on its inner side with a hole 29 in which may be inserted the end of a bait stick or bait-holding member 30, so that it will be securely held in an angular position with respect to said jaw 11, as shown in Fig. 3.

Under the present invention means are provided for setting the trap and holding the jaws in position to spring together which is comparatively sensitive to any pressure and which preferably so act without reference to the bait-holding means. Such means preferably comprise trigger members, of which one is constituted by a link 31 and the other by a link which is U-shape in cross-section, to provide two flanges 32, 33, said links being connected together by a pivot 34, to which end the link 31 projects into the space between said flanges. This construction is more clearly shown in Figs. 1 and 3. It will be seen that not only are the trigger members or links pivoted to each other but they are pivoted to the jaws or members 10, 11 so as to be located between the same, to which end the outer end of link 31 is connected by pivot 35 with jaw or member 11 and the link 32 by pivot 36 with jaw or member 10. It is preferred that the said trigger members or links are so mounted on the jaws as to move into them when the jaws are closed, to which end the said jaws are provided at about their mid-width with longitudinal slots or recesses 37, 38, in the outer ends of which the said pivots 35, 36 are located. The disposition of the said parts and their construction is such that when the jaws are open into V-shape as shown in Fig. 3, the said trigger members or links constitute a toggle lock, with the end pivots and the intermediate pivot lying on a dead line passing substantially through said pivots, the said toggle bridging the open jaws and locking them in open position.

Of course the described trap can be adapted for catching animals other than those which swim in the water, but in both cases the open jaws will be locked in a substantial V-formation, with the pivot or hinge connections of the jaws located at the lower end of the trap. The trap, however, is more desirable for catching aquatic animals such as mink and muskrats, to which end the said trap is adapted to float. To this end the jaws or spring-actuated members 10, 11 are composed of wood, and the metallic or other parts are located at the pivot or hinge joint of the jaws are heavy enough so that the center of gravity will be located at this point. Therefore when floating in the water in open V-form the relatively heavier parts at the hinge or pivot joint of the jaws will act as a keel to float the trap with the jaws extending upwardly therefrom, to possibly project above the surface of the water as indicated in Fig. 3. It will be seen that when the bait-holding means is properly applied to the trap its receiving end for the bait will be located at a point above the jaws or above the intermediate pivot 34 of the toggle so that when an aquatic animal swims to the trap in order to reach the bait, its body or its paws will come in contact with and bear downwardly upon the toggle or trigger members, whereupon the same will be unlocked and the trap sprung to grasp the animal. If the toggle lock such as described be employed the same can be made extremely sensitive, as the slightest pressure downwardly will break the toggle and spring the trap.

The modification shown in Figs. 7, 8 and 9 will now be described. In this form of the invention the jaws or spring members 40, 41 are composed of suitably heavy wire bent into shape so as to be of substantial U-shape. The frame or jaw 41 is provided at its inner end with a cross-bar 42 which receives the eyes 43, 44 bent up from the side portions of the other jaw or frame 40 so as to provide a pivot connection between the jaws. Coiled around the transverse bar 42 is a spring 45 provided with arms 46, 47 formed with loops or eyes 48, 49 which respectively engage one of the side bars of the jaw 40 and one of the side bars or jaw 41 at the opposite side of the trap. The tendency of said spring as in the case of the other trap described is to spring the jaws together. Means are provided for setting the jaws apart into substantial V-form, to which end the outer cross-bars 50, 51 of said jaws carry movable jaw-setting members 52, 53 which act as a trigger and are adapted to lock the jaws apart in a manner somewhat like that in the trap before described. The jaw-setting members 52, 53 are composed of wood or similar buoyant material so that when the trap is set it may float. The preferable way to pivotally connect the jaw-setting members each with its own supporting jaw is to provide a metal clip or plate 54 which is secured onto the end of each jaw, while each member 52, 53 is provided with a transverse groove or recess 55 in that end to which the clip or plate 54 is applied, so that the cross-bar of the respective jaw will pass through the same.

It will be seen that when the jaw-setting or trigger members 52, 53 are taken hold of and the jaws forced apart so that the said members 52, 53 may be set against each other end for end, the said jaws will be set in open position. A slight pressure downwardly will spring the trap. Bait-holding means may be provided as shown, the same consisting of a barb or pin 56 which is secured to that surface of one of the jaws which will be uppermost when the trap is set, or obviously the bait may be tied onto one of the jaws. A line is used to anchor the trap in the water.

Obviously the invention is susceptible of other modifications, as parts may be omitted, parts added and parts modified without departing from the scope of the invention as expressed in the claims.

What I claim as new is:—

1. In a trap, the combination with a pair of connected spring-actuated members of jaw-setting means, comprising two movable trigger members, applied one to each of said spring members, said trigger members being movable laterally and in endwise relation to each other so as to bridge and hold said spring members open and said trigger members being adapted to break inwardly under a slight downward pressure toward the connection between said spring members, and bait-holding means located above the adjacent ends of said trigger members when they are in said endwise relationship, which trigger members are adapted to set said trap independently of said bait-holding means.

2. In a trap, the combination with a pair of spring actuated members, of a toggle device for setting said members in open position, and bait-holding means carried by one of said jaw-members out of contact with said toggle at a point substantially opposite adjacent ends of the members of said toggle.

3. In a trap, the combination with a pair of connected spring actuated jaws, of two links pivoted thereto, and pivoted to each other so as to bridge the opening between said jaws and fold inwardly toward the connection between said jaws, said links constituting a toggle to set said jaws, and bait-holding means carried by one of said jaw-members out of contact with said toggle.

4. In a trap, the combination with a pair of spring actuated members, of a toggle device for alone setting said members in open position, and bait-holding means carried by one of said jaw-members out of contact with said toggle device, said trap being composed in part of buoyant material enabling it to float and position the bait-holding end of said holding means above said toggle device.

5. In a trap, the combination with a pair of spring actuated members pivoted together at their lower ends, of a toggle device pivoted thereto above said lower ends for setting said members in open position, and adapted to fold inwardly toward the pivot connection between said members, and bait-holding means carried by one of said jaw-members out of contact with said toggle device, said trap being composed in part of buoyant material enabling it to float and support the bait-holding end of said holding means above the water and above said toggle device when the latter is set.

6. In a trap, a pair of spring actuated grasping members of buoyant material, pivoted together at one end, and submerging means at said end for floating said trap with said members extending upright in open V-form.

7. In a trap, the combination with a pair of spring actuated members composed of buoyant material, pivoted together at their lower ends while their outer ends constitute jaws, of two links pivoted to said members above said ends, between said jaws and to each other, and constituting a toggle to set said members in open V-form, the pivoted ends of said members constituting a keel, to which end said pivoted ends are weighted to provide submerging means for the said ends and to cause the jaw ends thereof to protrude above the surface of the water.

8. In a trap, the combination with a pair of spring actuated members composed of buoyant material, pivoted together at their lower ends while their outer ends constitute jaws, of two links pivoted to said members, between said jaws and to each other, said links being foldable together inwardly toward the said pivotal connection of said members and constituting a toggle to set said members in open V-form, and bait-holding means extending upwardly from one of said members, and between which means and said pivoted ends of said members said toggle is located, the pivoted ends of said members constituting a keel, to which end the said pivoted ends are weighted to provide submerging means for the said ends and to cause the jaw ends thereof to protrude above the surface of the water so that the receiving end of said bait-holding means is then positioned above said toggle.

9. In a trap, the combination of two openable spring-actuated members, and sensitive trigger means for alone setting said members in open position, said trap being composed partly of buoyant material, and being heavier adjacent one end of said members to provide a sort of keel, and in the floating position of which trap the said keel holds the axis around which said members move substantially horizontal, while the opening between said members is presented upwardly, said trigger means having an inward movement from its said position toward said heavier end or keel and being directly engageable by an animal and sensitive to downward pressure thereof in order to spring said trap.

10. In a trap, the combination of two openable spring-actuated jaws pivotally connected together at adjacent ends, and sensitive trigger means for setting said jaws into V-form in open position, said trigger means being located within said V and said trap being composed partly of buoyant material and partly of heavier material, the parts of heavier material being so disposed on said trap as to establish a sort of keel at the said connected ends of said jaws which form the angle of said V, whereby said trap is adapted to right itself in water and cause the opening in the angle of said V between the other or grasping ends of said jaws to be presented in trapping position at all times when said trap is set and floating in the water, and bait-holding means located above said trigger means when the latter is set and the trap is in floating and trapping position.

Signed at Cazenovia, N. Y. this 30 day of December, 1914.

WOLTERS LEDYARD.

Witnesses:
E. REMINGTON,
JOHN WALSH.

Copies of this patent may be obtained for five cents each, by addressing the "Commissioner of Patents, Washington, D. C."

It is hereby certified that in Letters Patent No. 1,160,623, granted November 16, 1915, upon the application of Wolters Ledyard, of Cazenovia, New York, for an improvement in "Animal-Traps," errors appear in the printed specification requiring correction as follows: Page 2, line 53, strike out the word "are;" page 3, line 23, claim 2, after the word "for" insert the word *alone;* and that the said Letters Patent should be read with these corrections therein that the same may conform to the record of the case in the Patent Office.

Signed and sealed this 7th day of December, A. D., 1915.

[SEAL.]

R. F. WHITEHEAD,
*Acting Commissioner of Patents.*

Cl. 43—23.